US006272460B1

(12) United States Patent
Wu et al.

(10) Patent No.: US 6,272,460 B1
(45) Date of Patent: Aug. 7, 2001

(54) METHOD FOR IMPLEMENTING A SPEECH VERIFICATION SYSTEM FOR USE IN A NOISY ENVIRONMENT

(75) Inventors: Duanpei Wu, Sunnyvale, CA (US); Miyuki Tanaka, Tokyo (JP); Lex Olorenshaw, Corte Madera, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 0 days.

(21) Appl. No.: 09/264,288

(22) Filed: Mar. 8, 1999

Related U.S. Application Data

(60) Provisional application No. 60/099,739, filed on Sep. 10, 1998.

(51) Int. Cl.[7] .............................. G10L 19/00; G10L 17/00

(52) U.S. Cl. .......................... 704/226; 704/219; 704/220; 704/223

(58) Field of Search ..................................... 704/219, 220, 704/221, 222, 223, 226, 233, 263

(56) References Cited

U.S. PATENT DOCUMENTS

| | | | | |
|---|---|---|---|---|
| 4,737,976 | * | 4/1988 | Borth et al. | 379/58 |
| 5,428,707 | | 6/1995 | Gould et al. | 704/231 |
| 5,675,704 | | 10/1997 | Juang et al. | 704/246 |
| 5,778,342 | | 7/1998 | Erell et al. | 704/256 |
| 6,023,674 | * | 2/2000 | Mekuria | 704/233 |
| 6,052,659 | * | 4/2000 | Mermelstein | 704/219 |
| 6,070,135 | * | 5/2000 | Kim et al. | 704/215 |
| 6,070,137 | | 5/2000 | Bloebaum et al. | 704/227 |
| 6,084,967 | * | 7/2000 | Kennedy et al. | 380/247 |

OTHER PUBLICATIONS

Martin, Philippe, "Comparison of Pitch Detection By Cepstrum and Spectral Comb Analysis," *Proceedings of ICASSP,* 1982, pp. 180–183.

Tucker, R., "Voice Activity Detection Using A Periodicity Measure," *IEEE Proceedings*–1, vol. 139, No. 4, Aug. 1992, pp. 377–380.

Hermes, Dik J., "Pitch Analysis," *Visual Representations of Speech Signals,* 1993, pp. 3–15.

* cited by examiner

*Primary Examiner*—Richemond Dorvil
*Assistant Examiner*—Susan McFadden
(74) *Attorney, Agent, or Firm*—Gregory J. Koerner; Simon & Koerner LLP

(57) ABSTRACT

A method for implementing a speech verification system for use in a noisy environment comprises the steps of generating a confidence index for an utterance using a speech verifier, and controlling the speech verifier with a processor, wherein the utterance contains frames of sound energy. The speech verifier includes a noise suppressor, a pitch detector, and a confidence determiner. The noise suppressor suppresses noise in each frame in the utterance by summing a frequency spectrum for each frame with frequency spectra of a selected number of previous frames to produce a spectral sum. The pitch detector applies a spectral comb window to each spectral sum to produce correlation values for each frame in the utterance. The pitch detector also applies an alternate spectral comb window to each spectral sum to produce alternate correlation values for each frame in the utterance. The confidence determiner evaluates the correlation values to produce a frame confidence measure for each frame in the utterance. The confidence determiner then uses the frame confidence measures to generate the confidence index for the utterance, which indicates whether the utterance is or is not speech.

34 Claims, 12 Drawing Sheets

Noisy Speech
Speech
Noise
122
112
114
116
120

METHOD FOR IMPLEMENTING A SPEECH VERIFICATION SYSTEM FOR USE IN A NOISY ENVIRONMENT

CROSS-REFERENCE TO RELATED APPLICATION

This application is related to, and claims priority in, U.S. Provisional Patent Application Ser. No. 60/099,739, entitled "Speech Verification Method For Isolated Word Speech Recognition," filed on Sep. 10, 1998. The related applications are commonly assigned.

BACKGROUND OF THE INVENTION

1. Field of the Invention

This invention relates generally to electronic speech recognition systems and relates more particularly to a method for implementing a speech verification system for use in a noisy environment.

2. Description of the Background Art

Implementing an effective and efficient method for system users to interface with electronic devices is a significant consideration of system designers and manufacturers. Voice-controlled operation of electronic devices is a desirable interface for many system users. For example, voice-controlled operation allows a user to perform other tasks simultaneously. For instance, a person may operate a vehicle and operate an electronic organizer by voice control at the same time. Hands-free operation of electronic systems may also be desirable for users who have physical limitations or other special requirements.

Hands-free operation of electronic devices may be implemented by various speech-activated electronic systems. Speech-activated electronic systems thus advantageously allow users to interface with electronic devices in situations where it would be inconvenient or potentially hazardous to utilize a traditional input device.

Speech-activated electronic systems may be used in a variety of noisy environments, for instance industrial facilities, manufacturing facilities, commercial vehicles, and passenger vehicles. A significant amount of noise in an environment may interfere with and degrade the performance and effectiveness of speech-activated systems. System designers and manufacturers typically seek to develop speech-activated systems that provide reliable performance in noisy environments.

In a noisy environment, sound energy detected by a speech-activated system may contain speech and a significant amount of noise. In such an environment, the speech may be masked by the noise and be undetected. This result is unacceptable for reliable performance of the speech-activated system.

Alternatively, sound energy detected by the speech-activated system may contain only noise. The noise may be of such a character that the speech-activated system identifies the noise as speech. This result reduces the effectiveness of the speech-activated system, and is also unacceptable for reliable performance. Verifying that a detected signal is actually speech increases the effectiveness and reliability of speech-activated systems.

Therefore, for all the foregoing reasons, implementing an effective and efficient method for a system user to interface with electronic devices remains a significant consideration of system designers and manufacturers.

SUMMARY OF THE INVENTION

In accordance with the present invention, a method is disclosed for implementing a speech verification system for use in a noisy environment. In one embodiment, the invention includes the steps of generating a confidence index for an utterance using a speech verifier, and controlling the speech verifier with a processor. The speech verifier includes a noise suppressor, a pitch detector, and a confidence determiner.

The utterance preferably includes frames of sound energy, and a pre-processor generates a frequency spectrum for each frame n in the utterance. The noise suppressor suppresses noise in the frequency spectrum for each frame n in the utterance. Each frame n has a corresponding frame set that includes frame n and a selected number of previous frames. The noise suppressor suppresses noise in the frequency spectrum for each frame by summing together the spectra of frames in the corresponding frame set to generate a spectral sum. Spectra of frames in a frame set are similar, but not identical. Prior to generating the spectral sum, the noise suppressor aligns the frequencies of each spectrum in the frame set with the spectrum of a base frame of the frame set.

The pitch detector applies a spectral comb window to each spectral sum to produce correlation values for each frame in the utterance. The frequency that corresponds to the maximum correlation value is selected as the optimum frequency index. The pitch detector also applies an alternate spectral comb window to each spectral sum to produce alternate correlation values for each frame in the utterance. The frequency that corresponds to the maximum alternate correlation value is selected as the optimum alternate frequency index.

The confidence determiner evaluates the correlation values to produce a frame confidence measure for each frame in the utterance. First, confidence determiner calculates a harmonic index for each frame. The harmonic index indicates whether the spectral sum for each frame contains peaks at more than one frequency. Next, the confidence determiner evaluates a maximum peak of the correlation values for each frame to determine a frame confidence measure for each frame.

The confidence determiner then uses the frame confidence measures to generate the confidence index for the utterance, which indicates whether the utterance is speech or not speech. The present invention thus efficiently and effectively implements a speech verification system for use in a noisy environment.

BRIEF DESCRIPTION OF THE DRAWINGS

FIG. 1(*b*) is an exemplary waveform diagram for one embodiment of speech energy without noise energy;

FIG. 1(*c*) is an exemplary waveform diagram for one embodiment of noise energy without speech energy;

FIG. 11(*b*) is a flowchart of further method steps for speech verification, including confidence determination, according to one embodiment of the present invention.

DETAILED DESCRIPTION OF THE PREFERRED EMBODIMENT

The present invention relates to an improvement in speech recognition systems. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown, but is to be accorded the widest scope consistent with the principles and features described herein.

The present invention includes the steps of generating a confidence index for an utterance using a speech verifier, and controlling the speech verifier with a processor, wherein the utterance contains frames of sound energy. The speech verifier preferably includes a noise suppressor, a pitch detector, and a confidence determiner. The noise suppressor suppresses noise in each frame of the utterance by summing a frequency spectrum for each frame with frequency spectra of a selected number of previous frames to produce a spectral sum. The pitch detector applies a spectral comb to each spectral sum to produce correlation values for each frame of the utterance. The pitch detector also applies an alternate spectral comb to each spectral sum to produce alternate correlation values for each frame of the utterance. The confidence determiner evaluates the correlation values to produce a frame confidence measure for each frame in the utterance. The confidence determiner then uses the frame confidence measures to generate the confidence index for the utterance, which indicates whether the utterance is speech or not speech.

Figures 1A, 1B, 1C:
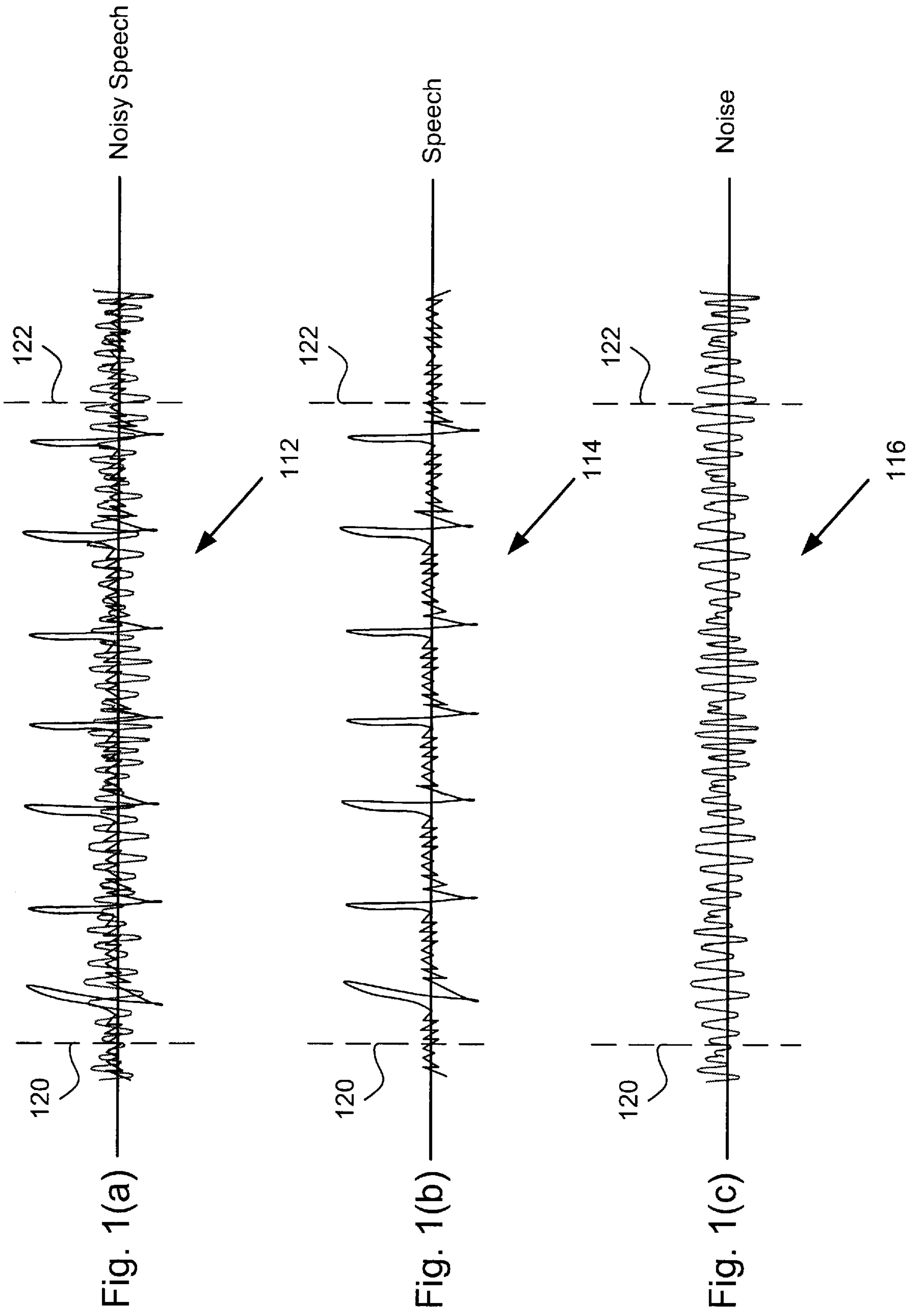
FIG. 1(*a*) is an exemplary waveform diagram for one embodiment of noisy speech energy.

Referring now to FIG. 1(*a*), an exemplary waveform diagram for one embodiment of noisy speech energy 112 is shown. Endpoints 120 and 122 identify the beginning and end of a spoken utterance, respectively. FIG. 1(*b*) shows an exemplary waveform diagram for one embodiment of speech energy 114 without noise energy. Similarly, FIG. 1(*c*) shows an exemplary waveform diagram for one embodiment of noise energy 116 without speech energy. Noisy speech 112 of FIG. 1(*a*) is typically comprised of speech energy 114 and noise energy 116.

Figure 2:
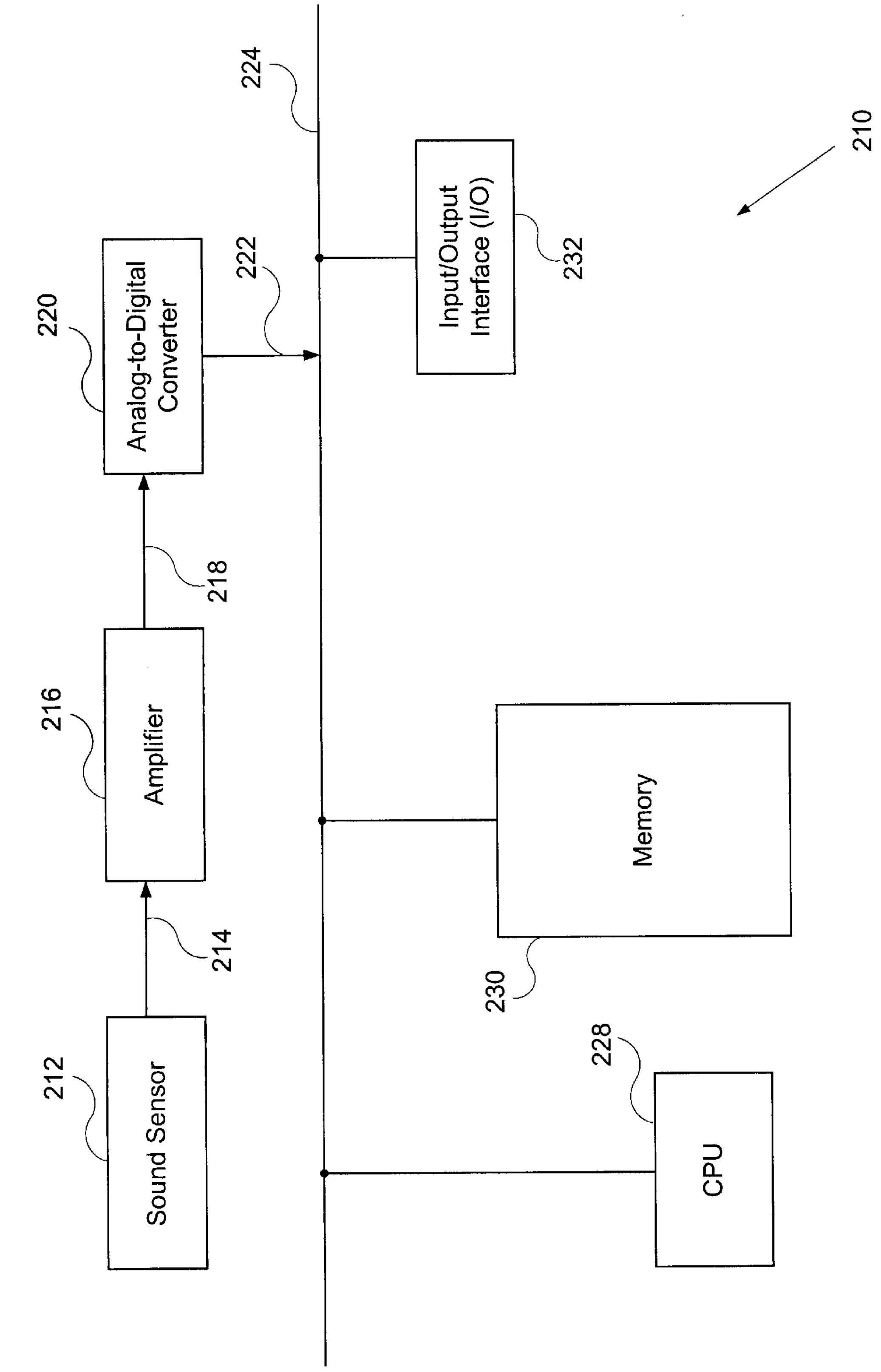
FIG. 2 is a block diagram for one embodiment of a computer system, according to the present invention.

Referring now to FIG. 2, a block diagram for one embodiment of a computer system 210 is shown, according to the present invention. The FIG. 2 embodiment includes a sound sensor 212, an amplifier 216, an analog-to-digital converter 220, a central processing unit (CPU) 228, a memory 230, and an input/output interface 232.

Sound sensor 212 detects sound energy and converts the detected sound energy into an analog speech signal that is provided via line 214 to amplifier 216. Amplifier 216 amplifies the received analog speech signal and provides the amplified analog speech signal to analog-to-digital converter 220 via line 218. Analog-to-digital converter 220 then converts the amplified analog speech signal into corresponding digital speech data at a sampling rate of 16 kilohertz. Analog-to-digital converter 220 then provides the digital speech data via line 222 to system bus 224.

CPU 228 may then access the digital speech data on system bus 224 and responsively analyze and process the digital speech data to perform speech detection according to software instructions contained in memory 230. The operation of CPU 228 and the software instructions in memory 230 are further discussed below in conjunction with FIGS. 3–11. After the speech data is processed, CPU 228 may then provide the results of the speech detection analysis to other devices (not shown) via input/output interface 232.

Figure 3:
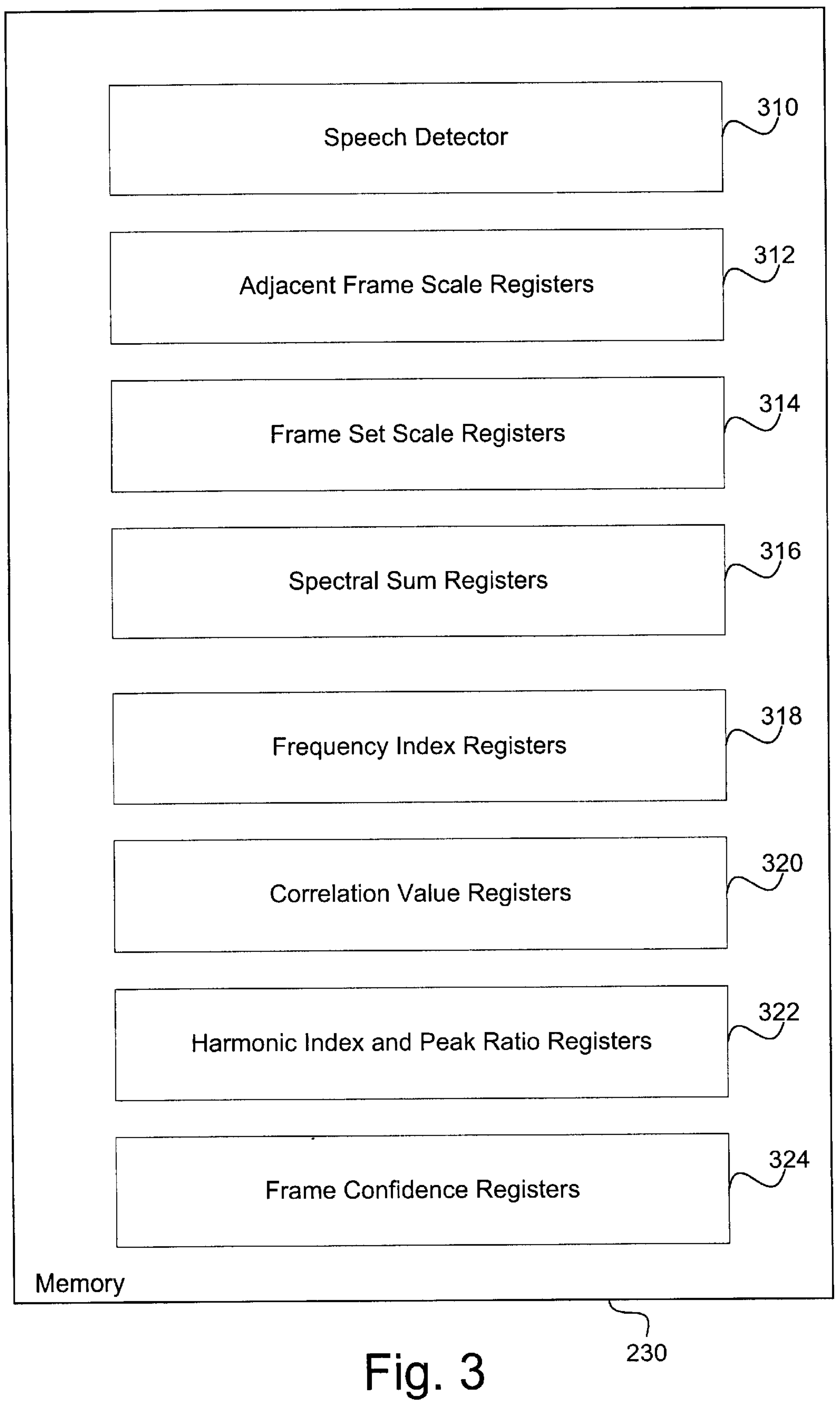
FIG. 3 is a block diagram for one embodiment of the memory of FIG. 2, according to the present invention.

Referring now to FIG. 3, a block diagram for one embodiment of the memory 230 of FIG. 2 is shown, according to the present invention. Memory 230 may alternately comprise various storage-device configurations, including random access memory (RAM) and storage devices such as floppy discs or hard disc drives. In the FIG. 3 embodiment, memory 230 includes, but is not limited to, a speech detector 310, adjacent frame scale registers 312, frame set scale registers 314, spectral sum registers 316, frequency index registers 318, correlation value registers 320, harmonic index and peak ratio registers 322, and frame confidence registers 324.

In the FIG. 3 embodiment, speech detector 310 includes a series of software modules that are executed by CPU 228 to analyze and detect speech data, and which are further described below in conjunction with FIGS. 4–11. In alternate embodiments, speech detector 310 may readily be implemented using various other software and/or hardware configurations.

Adjacent frame scale registers 312, frame set scale registers 314, spectral sum registers 316, frequency index registers 318, correlation value registers 320, harmonic index and peak ratio registers 322, and frame confidence registers 324 contain respective variable values that are calculated and utilized by speech detector 310 to implement the speech verification method of the present invention. The utilization and functionality of adjacent frame scale registers 312, frame set scale registers 314, spectral sum registers 316, frequency index registers 318, correlation value registers 320, harmonic index and peak ratio registers 322, and frame confidence registers 324 are further discussed below in conjunction with FIGS. 6–11.

Figure 4:
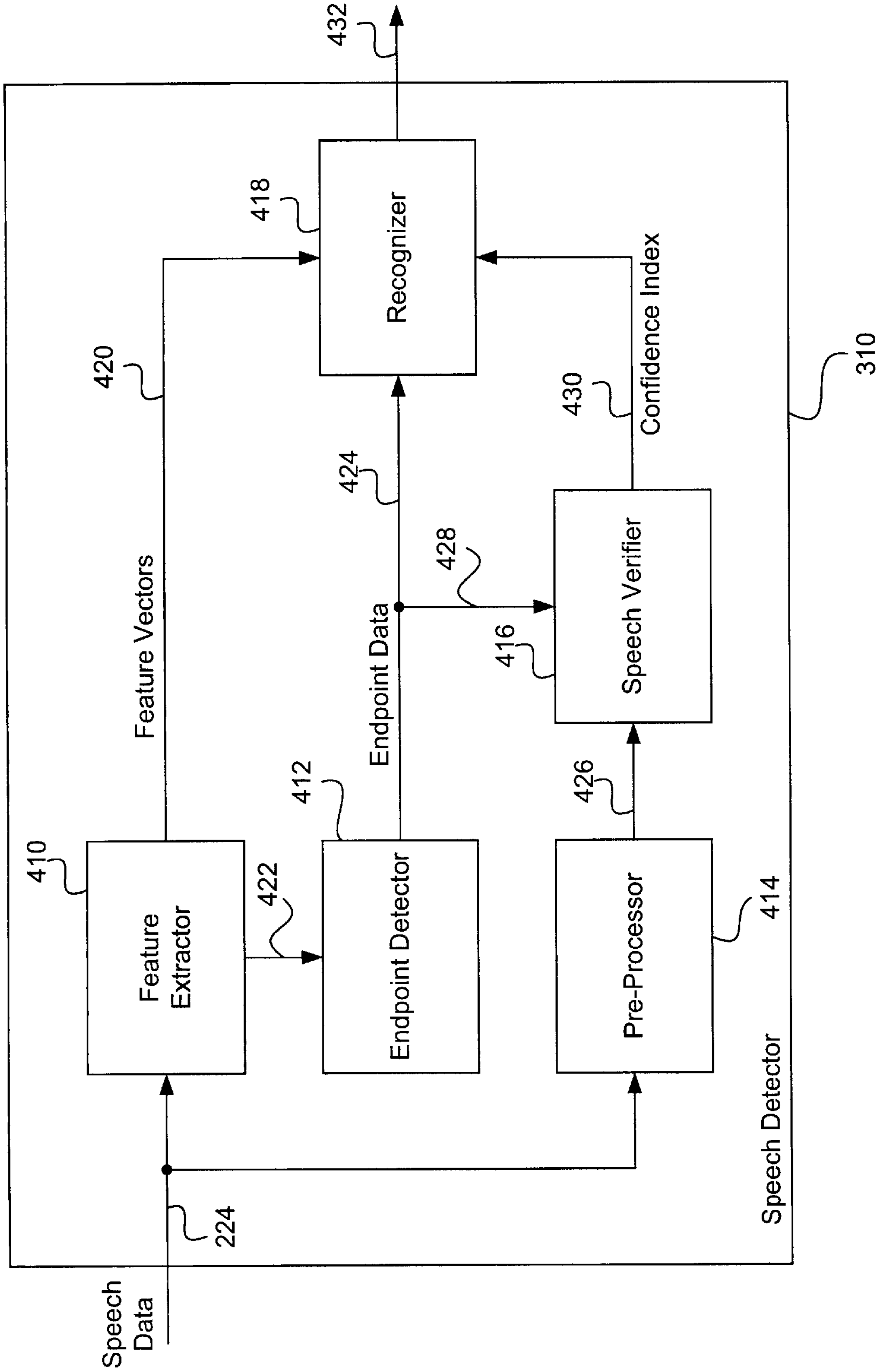
FIG. 4 is a block diagram for one embodiment of the speech detector of FIG. 3, according to the present invention.

Referring now to FIG. 4, a block diagram for one embodiment of the speech detector 310 of FIG. 3 is shown, according to the present invention. Speech detector 310 includes, but is not limited to, a feature extractor 410, an endpoint detector 412, a pre-processor 414, a speech verifier 416, and a recognizer 418.

Analog-to-digital converter 220 (FIG. 2) provides digital speech data to feature extractor 410 via system bus 224. Feature extractor 410 responsively generates feature vectors, which are provided to recognizer 418 via path 420. Feature extractor 410 further responsively generates speech energy to endpoint detector 412 via path 422. Endpoint detector 412 analyzes the speech energy and responsively determines endpoints of an utterance represented by the speech energy. The endpoints indicate the beginning and end of the utterance in time. Endpoint detector 412 then provides the endpoints to recognizer 418 via path 424.

Analog-to-digital converter 220 also provides digital speech data to pre-processor 414. In the FIG. 4 embodiment, pre-processor 414 applies a low-pass filter with a cut-off frequency of 2 kilohertz (kHz) to the digital speech data. Pre-processor 414 then down-samples the filtered digital data from 16 kHz to 4 kHz. In other words, pre-processor 414 discards three out of every four samples of the filtered digital data.

Pre-processor 414 next applies a 40 millisecond (ms) Hanning window to the digital speech data. Applying the 40 ms window to the digital speech data quantizes the digital speech data into portions of 40 ms in size to facilitate further analysis. Although a 40 ms Hanning window is disclosed, windows of other sizes and shapes are within the scope of the present invention.

Pre-processor 414 next applies a 1024 point Fast Fourier Transform (FFT) to the windowed digital data. Pre-processor 414 performs the FFT to produce a frequency spectrum for each frame of the digital speech data. Frames are further discussed below in conjunction with FIG. 5.

Figure 5:
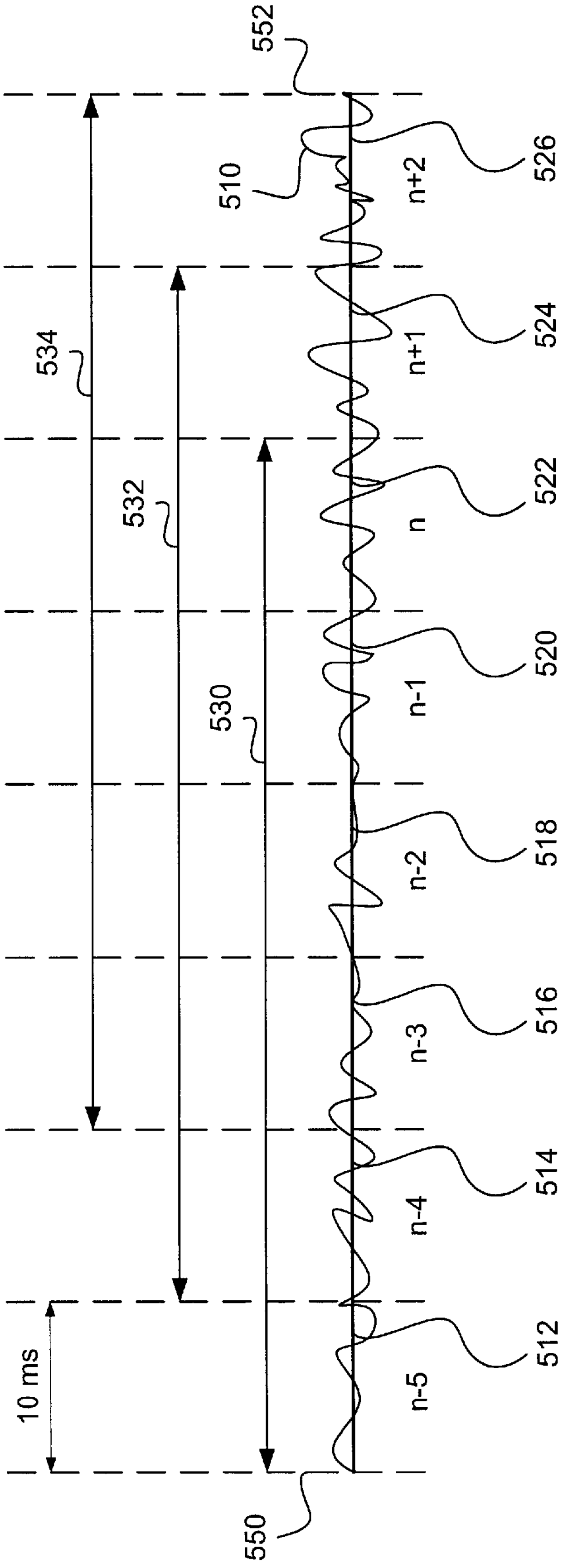
FIG. 5 is a diagram for one embodiment of frames of speech energy, according to the present invention.

Referring now to FIG. 5, a diagram for one embodiment of frames of speech energy is shown, according to the present invention. FIG. 5 includes speech energy 510 which extends from time 550 to time 552, and which is presented for purposes of illustration. Speech energy 510 is divided into equal-sized frames. In FIG. 5, each frame contains 10 milliseconds of speech data; however, frames of different lengths are within the scope of the present invention.

Each frame has a corresponding frame set that includes a selected number of previous frames. In FIG. 5, each frame set includes six frames; however, a frame set may contain any number of frames. Frame set 530 includes frame 522 and five previous frames 512–520. Frame set 532 includes frame 524 and five previous frames 514–522. Frame set 534 includes frame 526 and five previous frames 516–524.

Returning now to FIG. 4, pre-processor 414 provides the frequency spectra (hereinafter spectra) produced by the FFT to speech verifier 416 via path 426. Speech verifier 416 also receives endpoint data from endpoint detector 412 via path 428. Speech verifier 416 analyzes the spectra of frames that fall between endpoints. In other words, speech verifier 416 processes speech data corresponding to an utterance defined by endpoints. Speech verifier 416 analyzes the spectra of frames in the utterance to determine a confidence index for the utterance. Speech verifier 416 provides the confidence index to recognizer 418 to indicate whether the utterance is or is not speech. Recognizer 418 provides verified speech data to system bus 224 for further processing by computer system 210.

Figure 6:
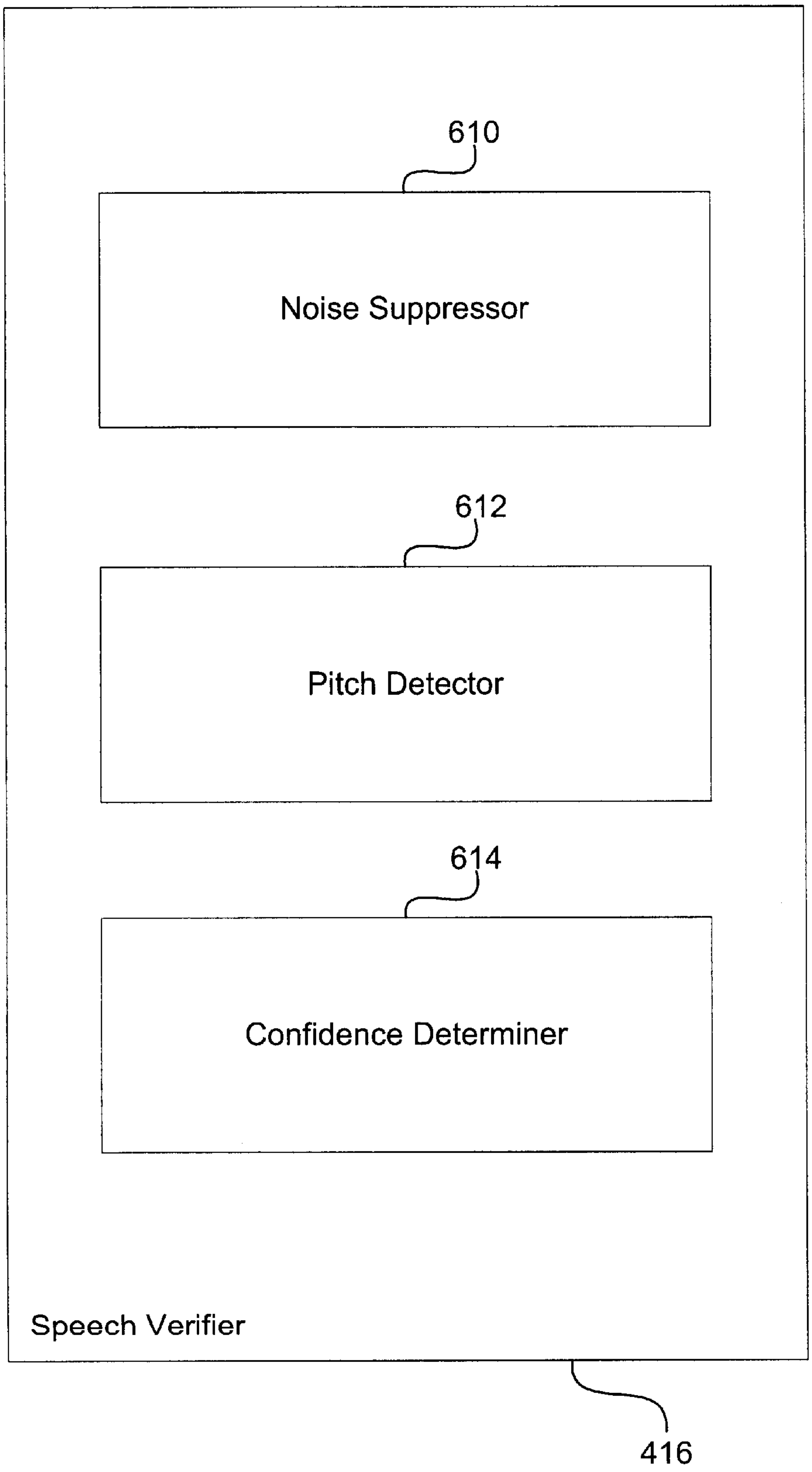
FIG. 6 is a block diagram for one embodiment of the speech verifier of FIG. 4, according to the present invention.

Referring now to FIG. 6, a block diagram for one embodiment of the speech verifier 416 of FIG. 4 is shown, according to the present invention. Speech verifier 416 includes, but is not limited to, a noise suppressor 610, a pitch detector 612, and a confidence determiner 614. Noise suppressor 610 suppresses noise in the spectrum for each frame in the utterance. The functionality of noise suppressor 610 is discussed below in conjunction with FIG. 7.

Pitch detector 612 implements a pitch detection process for each frame in the utterance. Pitch detector 612 is discussed further below in conjunction with FIGS. 8–11. Confidence determiner 614 determines the confidence index to verify that the utterance is speech. The functionality of confidence determiner 614 is discussed below in conjunction with FIGS. 10–11.

Figure 7:
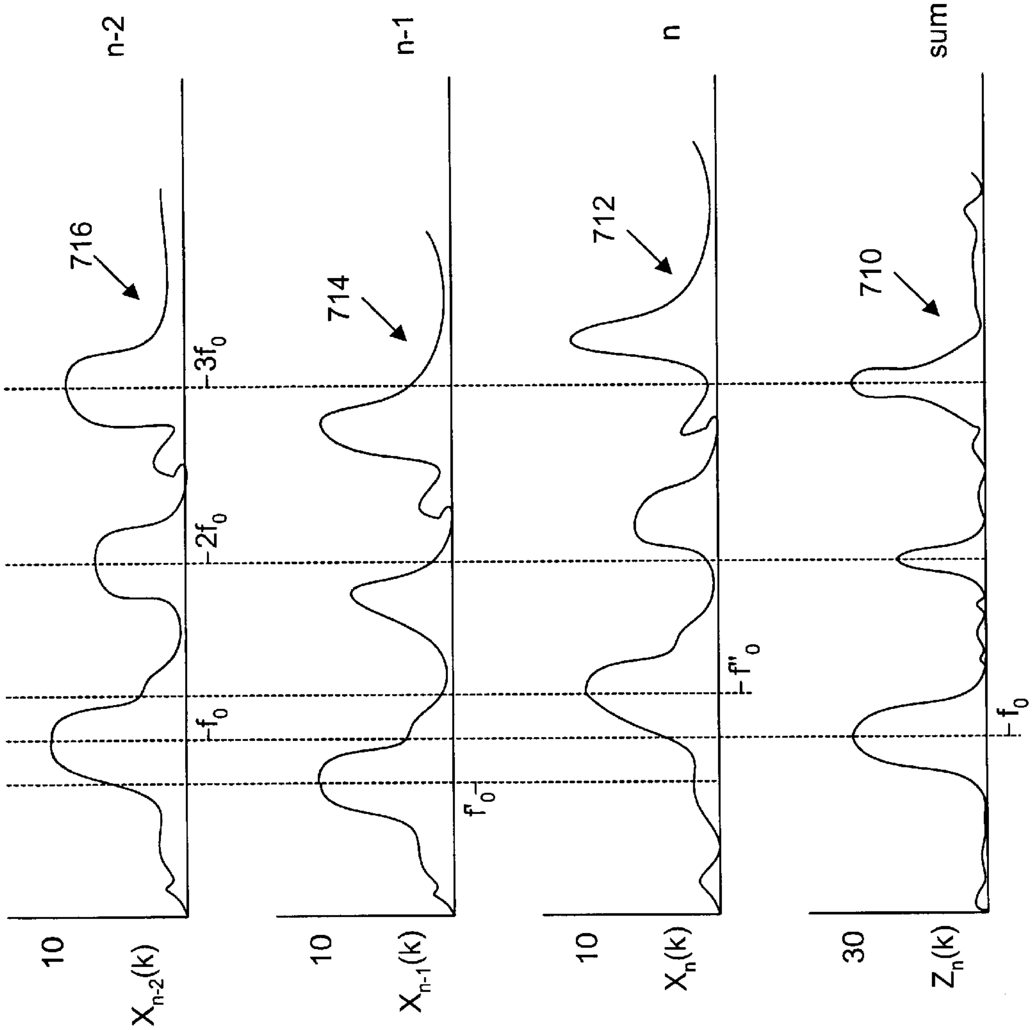
FIG. 7 is a diagram for one embodiment of frequency spectra for three adjacent frames of speech energy and a spectral sum, according to the present invention.

Referring now to FIG. 7, a diagram of frequency spectra 712 through 716 for three adjacent frames of speech energy in an utterance and a spectral sum 710 is shown, according to one embodiment of the present invention. In FIG. 7, a frame set having three frames is shown for ease of discussion, however a frame set typically includes a greater number of frames.

As shown in FIG. 7, spectra of adjacent frames in an utterance are similar, but not identical. Peaks occur in each spectrum at integer multiples, or harmonics, of a fundamental frequency of the speech signal. For example, spectrum 716 of frame n−2 has a fundamental frequency at $f_0$. Spectrum 714 of frame n−1 has a similar shape and a different fundamental frequency, $f'_0$. Spectrum 712 of frame n has a fundamental frequency $f''_0$, which differs from the fundamental frequencies of spectra 714 and 716.

To suppress the noise in spectrum 712 for frame n, noise suppressor 610 preferably sums spectrum 712 with all other spectra in the frame set corresponding to frame n to produce spectral sum 710. Noise suppressor 610 calculates a spectral sum for each frame in the utterance by summing the spectrum of each frame with the spectra of the previous frames in each corresponding frame set. Spectral summation enhances the magnitude of the spectra at the harmonic frequencies. The magnitude of peaks in the spectra due to noise are not enhanced because noise in each frame is typically not correlated with noise in adjacent frames.

Before a spectral sum is calculated, the fundamental frequencies of all the frames in a frame set are preferably aligned. In FIG. 7, the frequencies of spectrum 712 and spectrum 714 are preferably aligned with the frequencies of spectrum 716, which is the spectrum of the base frame of the frame set for frame n.

To align the frequencies of the spectra, noise suppressor 610 first determines an adjacent frame alignment scale, α, for each frame. The adjacent frame alignment scale is used to compress or expand the frequency axis of a spectrum. The adjacent frame alignment scale is determined so that the differences between spectra of adjacent frames are minimized. The adjacent frame alignment scale may be expressed as $$\alpha_{n-1} = \arg\min_{\alpha}\left(\sum_k |X_n(k) - X_{n-1}(\alpha k)|\right)$$

where $\alpha_{n-1}$ is the adjacent frame alignment scale between adjacent frame spectra, $X_n(k)$ is the spectrum of frame n, and $X_{n-1}(\alpha k)$ is the adjusted spectrum of adjacent frame n−1.

Noise suppressor 610 determines the value of $\alpha_{n-1}$ by performing an exhaustive search within a small range of values for α, typically between 0.95 and 1.05. For each value of α, noise suppressor 610 calculates a difference between the spectrum of frame n and the spectrum of frame n−1. The value of α that results in the smallest difference (arg min) is selected as the adjacent frame alignment scale. Noise suppressor 610 preferably stores the adjacent frame alignment scale value for each frame in adjacent frame scale registers 312 (FIG. 3).

Noise suppressor 610 next calculates a frame set scale to align all of the spectra of a frame set with the spectrum of the base frame of the frame set. In FIG. 7, spectrum 716 is the base frame of the frame set for frame n. A frame set scale, β, is calculated for each frame in the frame set according to the following:

$$\beta_n=1, \beta_{n-1}=\beta_n\alpha_{n-1}, \ldots, \beta_{n-N+1}=\beta_{n-N+2}\alpha_{n-N+1}$$

where $\beta_n$ is the frame set scale for frame n and N is the number of frames in the frame set. The frame set scale for each frame in the frame set is calculated by setting the frame set scale for frame n equal to 1, and then multiplying the frame set scale for each frame by the adjacent frame alignment scale of the previous frame. Noise suppressor 610 preferably stores the frame set scale values for each frame in frame set scale registers 314.

Noise suppressor 610 then sums together the spectra of each frame set using the frame set scale values to align the spectra. Spectral sum 710 may be expressed as $$Z_n(k) = \sum_{i=n}^{n-N+1} X_i(\beta_i k)$$

where $Z_n$(k) is the spectral sum for frame n, $X_i(\beta_i k)$ is an aligned spectrum of frame i, for i equal to n to n−N+1, and N is the number of frames in the frame set. Noise suppressor 610 determines the aligned spectrum X(βk) for each frame in the frame set and then sums together the aligned spectra of the frame set to produce the spectral sum Z(k). Noise suppressor 610 preferably stores the spectral sum for each frame in spectral sum registers 316 (FIG. 3).

As shown in FIG. 7, the frequencies of spectral sum 710 are aligned with the frequencies of spectrum 716. The magnitude of the spectrum for each frame n is enhanced at the harmonic frequencies and noise is suppressed. After noise suppressor 610 suppresses the noise for each frame n, pitch detector 612 performs a pitch detection process for each frame n, which is described below in conjunction with FIGS. 8 and 9.

Figure 8:
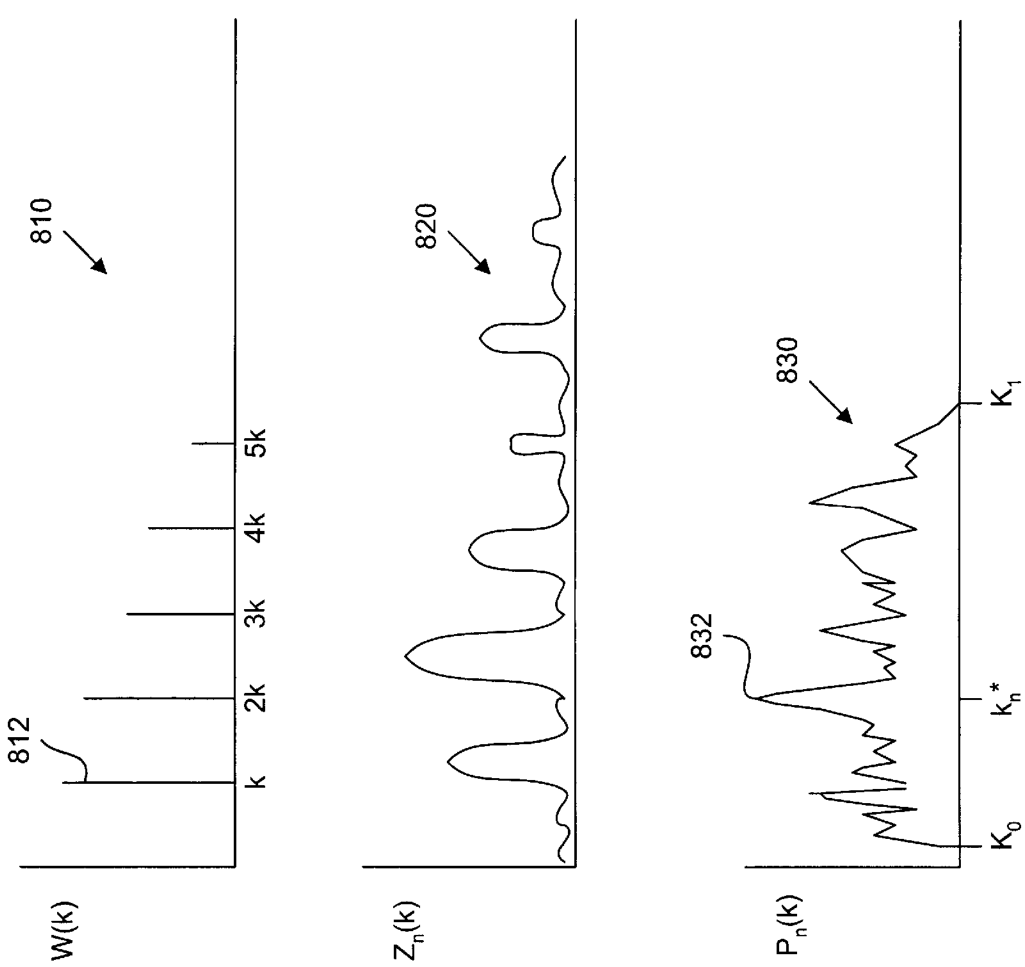
FIG. 8 is a diagram for one embodiment of a comb window, a spectral sum, and correlation values, according to the present invention.

Referring now to FIG. 8, a diagram of a comb window 810, a spectral sum 820, and correlation values 830 are shown, according to one embodiment of the present invention. Pitch detector 612 preferably performs a pitch detection process for each frame in the utterance. Pitch detector 612 preferably detects pitch for each frame by calculating correlation values between the spectral sum for each frame and a comb window.

In FIG. 8, comb window 810 is shown, having teeth 812 at integer multiples of variable frequency index k. The amplitude of the teeth 812 decreases with increasing frequency, typically exponentially. Pitch detector 612 multiplies comb window 810 by a logarithm of spectral sum 820 to generate correlation values 830 for each frame n in the utterance. Correlation values 830 may be expressed as $$P_n(k) = \sum_{i=1}^{N_1} W(ik)\log(|Z_n(ik)|),\ k = K_0, \ldots, K_1$$

where $P_n$(k) are correlation values 830 for frame n, W(ik) is comb window 810, $Z_n$(ik) is spectral sum 820 for frame n, $K_0$ is a lower frequency index, $K_1$ is an upper frequency index, and $N_1$ is the number of teeth 812 in comb window 810. For the FIG. 8 correlation values 830, $K_0$=13, $K_1$=102, and $N_1$=5, however, other values for $K_0$, $K_1$, and $N_1$ are within the scope of the present invention.

Pitch detector 612 multiplies comb window 810 by the logarithm of the spectral sum 820 for each value of i from i equal to 1 through $N_1$ to produce $N_1$ products and then sums the products together to produce a correlation value. Pitch detector 612 produces a correlation value for each k between $K_0$ and $K_1$ to produce correlation values 830. Pitch detector 612 preferably stores correlation values 830 in correlation value registers 320 (FIG. 3).

Correlation values 830 have a maximum value 832 at optimum frequency index $k_n$*. The maximum correlation value 832 typically occurs where the frequency index k of comb window 810 is equal to the fundamental frequency of spectral sum 820, however, the maximum correlation value 832 may occur at a different frequency. Pitch detector 612 identifies the frequency index that produces the maximum correlation value 832 as the optimum frequency index $k_n$*. The optimum frequency index may be expressed as $$k_n^* = \arg\max_k(P_n(k))$$

where $k_n$* is the optimum frequency index for frame n, and $P_n$(k) are correlation values 830 for frame n. Pitch detector 612 determines the value of $k_n$* by selecting the frequency index k that produces the maximum value 832 of $P_n$(k). Pitch detector 612 stores the optimum frequency index for each frame in frequency index registers 318 (FIG. 3).

Figure 9:
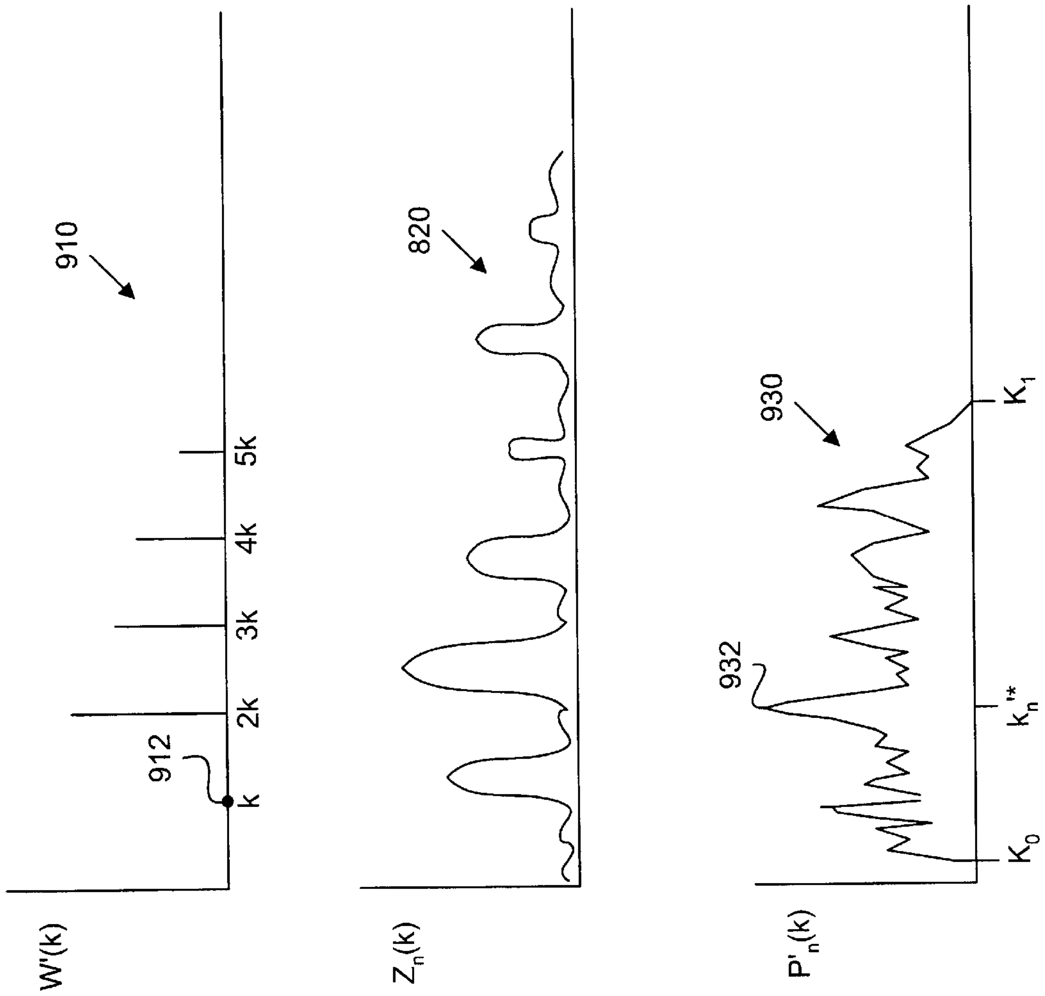
FIG. 9 is a diagram for one embodiment of an alternate comb window, a spectral sum, and alternate correlation values, according to the present invention.

Referring now to FIG. 9, a diagram of an alternate comb window 910, spectral sum 820, and alternate correlation values 930 are shown, according to one embodiment of the present invention. Pitch detector 612 may determine alternate correlation values 930 for each frame in the utterance to identify detected signals having only a single frequency component, which are not speech signals. If a detected signal contains sound energy having a single frequency, a spectral sum for that signal will have a peak at only one frequency.

Pitch detector 612 determines alternate correlation values 930 by multiplying alternate comb window 910 by a logarithm of spectral sum 820 for each frame. Alternate comb window 910 is similar to comb window 810 except that the amplitude of the first tooth 912 is zero. Alternate correlation values 930 may be expressed as $$P'_n(k) = \sum_{i=2}^{N_1} W(ik)\log(|Z_n(ik)|),\ k = K_0, \ldots, K_1$$

where $P'_n$(k) are alternate correlation values 930 for frame n, W(ik) is comb window 810, $Z_n$(ik) is spectral sum 820 of frame n, $K_0$ is the lower frequency index, $K_1$ is the upper frequency index, and $N_1$ is the number of teeth 812 in window 810. Beginning the FIG. 9 summation with i=2 effectively causes the first tooth of comb window 810 to have an amplitude of zero, resulting in comb window 910. For the FIG. 9 alternate correlation values 930, $K_0$=13, $K_1$=102, and $N_1$=5, however, other values for $K_0$, $K_1$, and $N_1$ are within the scope of the present invention.

Pitch detector 612 multiplies comb window 810 by the logarithm of the spectral sum 820 for each value of i from i equal to 2 through $N_1$ to produce $N_1$−1 products and then sums the products together to produce a correlation value. Pitch detector 612 produces a correlation value for each k between $K_0$ and $K_1$ to produce correlation values 930. Pitch detector 612 preferably stores alternate correlation values 930 in correlation value registers 320 (FIG. 3).

Pitch detector 612 then determines an optimum alternate frequency index, $k_n$'*. The optimum alternate frequency index is the frequency that corresponds to a maximum alternate correlation value 932. This may be expressed as $$k_n'^* = \arg\max_k(P'_n(k))$$

where $k'_n$* is the optimum alternate frequency index for frame n, and $P_n$'(k) are alternate correlation values 930 for frame n. Pitch detector 612 determines the value of $k'_n$* by selecting the frequency index k that produces the maximum value 932 of $P_n'(k)$. Pitch detector 612 preferably stores the optimum alternate frequency index for each frame in frequency index registers 318 (FIG. 3).

If the utterance has only one frequency component, the optimum alternate frequency index $k_n'^*$ will be different than the optimum frequency index $k_n^*$. However, if the utterance has more than one frequency component, the optimum alternate frequency index $k_n'^*$ is typically identical to the optimum frequency index $k_n^*$. In other words, maximum correlation value 832 and maximum alternate correlation value 932 will occur at the same frequency if the utterance contains more than one frequency component. Speech verifier 416 may use this result to identify detected utterances having only one frequency component as not being speech.

Figure 10:
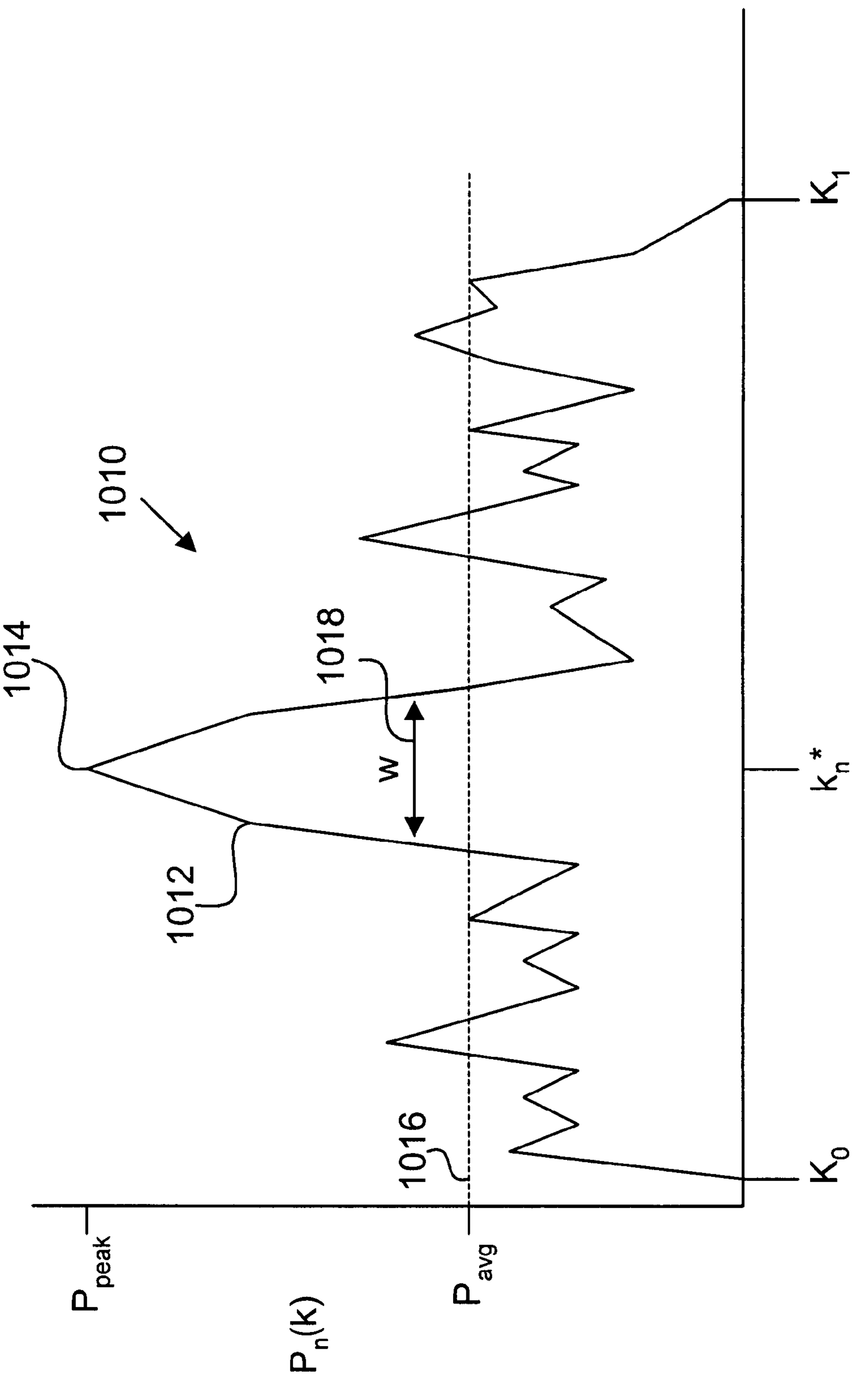
FIG. 10 is a diagram for one embodiment of correlation values, according to the present invention.

Referring now to FIG. 10, a diagram of correlation values 1010 is shown, according to one embodiment of the present invention. Once pitch detector 612 determines the correlation values, alternate correlation values, optimum frequency index, and optimum alternate frequency index for each frame in an utterance, confidence determiner 614 determines a confidence index for the utterance.

Confidence determiner 614 determines whether each frame is or is not speech by analyzing the quality of a maximum peak 1012 of correlation values 1010. The sharpness (height in relation to width) of maximum peak 1012 of correlation values 1010 is used as an indicator of the likelihood that the frame is speech. A sharp peak indicates that the frame is more likely speech.

Confidence determiner 614 first preferably determines a harmonic index for each frame n by comparing the optimum frequency index with the optimum alternate frequency index for each frame n. The harmonic index may be determined as follows:

$$h_n = \begin{cases} 1 & \text{if } k_n'^* = k_n^* \\ 0 & \text{otherwise} \end{cases}$$

where $h_n$ is the harmonic index for frame n, $k_n'^*$ is the optimum alternate frequency index for frame n, and $k_n^*$ is the optimum frequency index for frame n. A harmonic index equal to 1 indicates that the frame contains more than one frequency component, and thus may be a speech signal. A harmonic index equal to 0 indicates that the frame contains only one frequency component, and thus is not a speech signal. Confidence determiner 614 preferably stores the harmonic index for each frame in harmonic index and peak ratio registers 322 (FIG. 3).

Confidence determiner 614 next calculates a peak ratio, $R_n$, for each frame as a measure of height of maximum peak 1012. The peak ratio is calculated to normalize correlation values 1010 due to variations in signal strength of the utterance. Confidence determiner 614 calculates the peak ratio for each frame as follows:

$$R_n = \frac{P_{peak} - P_{avg}}{P_{peak}}$$

where $R_n$ is the peak ratio for frame n, $P_{peak}$ is a maximum correlation value 1014 for frame n, and $P_{avg}$ is an average 1016 of correlation values 1010 for frame n. Confidence determiner 614 preferably stores the peak ratio for each frame in harmonic index and peak ratio registers 322 (FIG. 3).

Confidence determiner 614 next preferably determines a frame confidence measure for each frame. Confidence determiner 614 determines the frame confidence measure as follows:

$$c_n = \begin{cases} 1 & \text{if } R_n Q > \gamma \text{ and } h_n = 1 \\ 0 & \text{otherwise} \end{cases}$$

where $c_n$ is the frame confidence measure for frame n, $R_n$ is the peak ratio for frame n, $h_n$ is the harmonic index for frame n, γ0 is a predetermined constant, and Q is an indicator of the sharpness of maximum peak 1012 of correlation values 1010. The value of Q is preferably 1/w, where w is a width 1018 of maximum peak 1012 at one-half maximum correlation value 1014. If the product of the peak ratio and Q is greater than γ and the harmonic index is equal to 1, then the frame confidence measure for frame n is set equal to 1 to indicate that frame n is speech. In the FIG. 10 embodiment, γ is equal to 0.05, however, other values for γ are within the scope of the present invention and may be determined experimentally. Confidence determiner 614 preferably stores the values of $c_n$ for each frame in frame confidence registers 324 (FIG. 3).

In the FIG. 10 embodiment, confidence determiner 614 next determines a confidence index for the utterance using the frame confidence measures. Confidence determiner 614 may determine a confidence index for an utterance as follows:

$$C = \begin{cases} 1 & \text{if } c_n = c_{n-1} = c_{n-2} = 1, \\ & \text{for any } n \text{ in the utterance} \\ 0 & \text{otherwise} \end{cases}$$

where C is the confidence index for the utterance, $c_n$ is the frame confidence measure for frame n, $c_{n-1}$ is the frame confidence measure for frame n−1, and $c_{n-2}$ is the frame confidence measure for frame n−2. Confidence determiner 614 thus sets the confidence index C for an utterance equal to 1 if the frame confidence measure is 1 for any three consecutive frames in the utterance, however, a different number of consecutive frames is within the scope of the present invention. A confidence index equal to 1 indicates that the utterance is speech, and a confidence index equal to 0 indicates that the utterance is not speech. Confidence determiner 614 preferably provides the confidence index to recognizer 418 (FIG. 4) to indicate that the utterance is or is not speech.

Figure 11A:
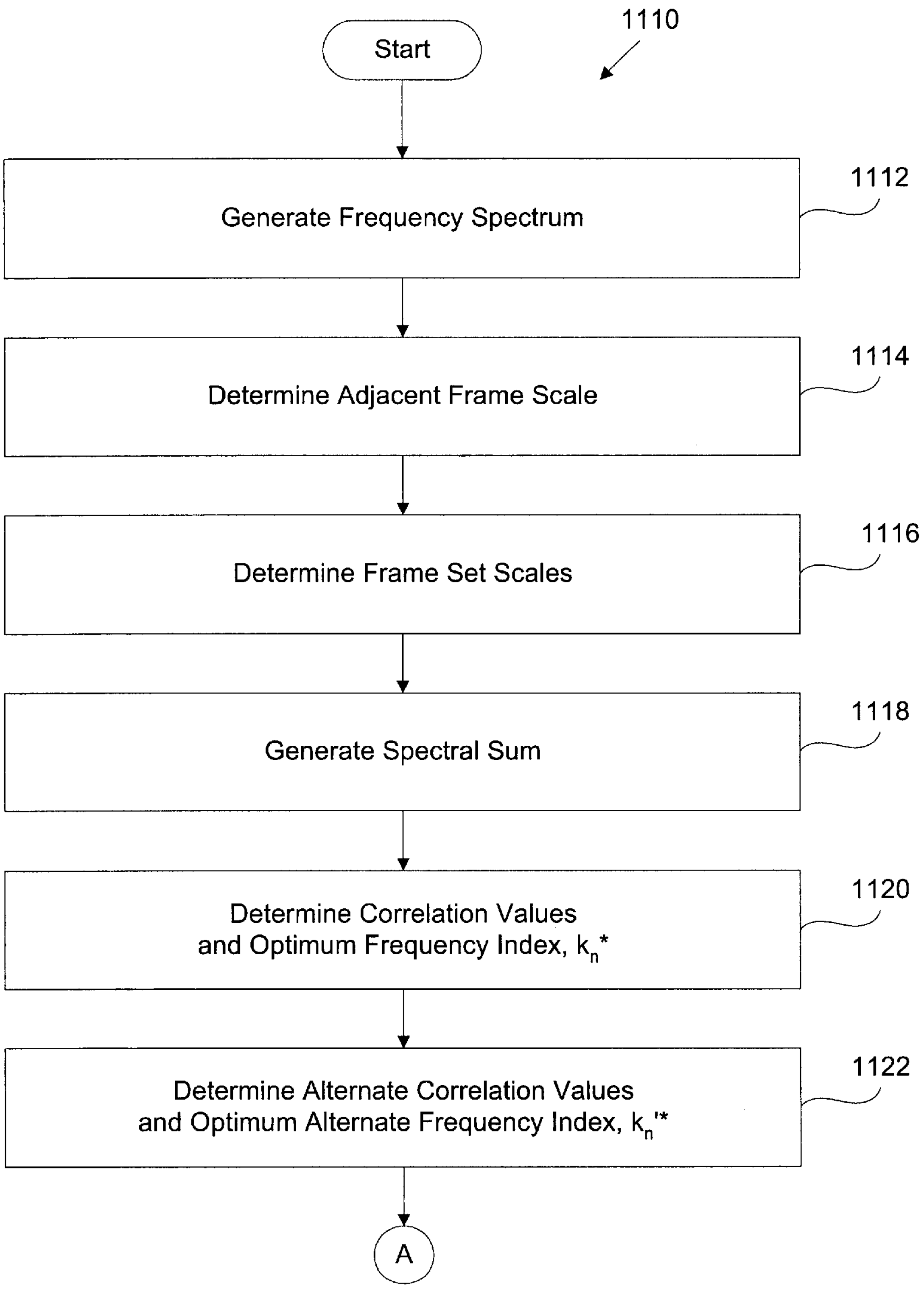
FIG. 11(*a*) is a flowchart of initial method steps for speech verification, including noise suppression and pitch detection, according to one embodiment of the present invention.
Figure 11B:
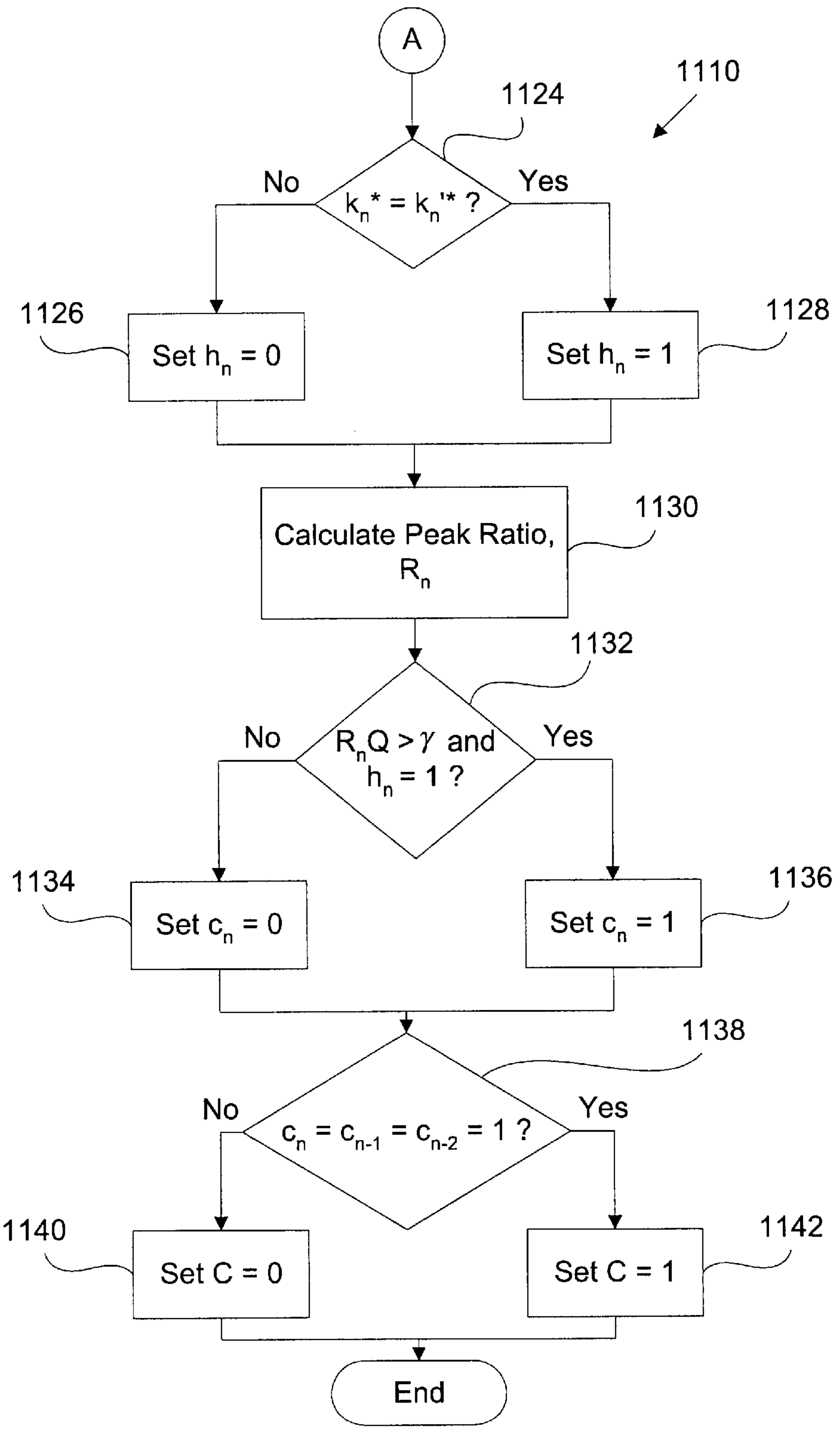

Referring now to FIG. 11(*a*), a flowchart of initial method steps 1110 for speech verification, including noise suppression and pitch detection, is shown for an arbitrary frame n, according to one embodiment of the present invention. In step 1112, pre-processor 414 generates a frequency spectrum for frame n, and provides the spectrum to speech verifier 416. In step 1114, noise suppressor 610 of speech verifier 416 determines an adjacent frame scale for frame n, as described above in conjunction with FIG. 7.

Then, in step 1116, noise suppressor 610 determines frame set scales for the corresponding frame set of frame n, as described above in conjunction with FIG. 7. In step 1118, noise suppressor 610 generates a spectral sum for frame n by summing the aligned spectra of the frame set. The spectral sum thus enhances the magnitude of the spectrum of frame n at the harmonic frequencies and effectively suppresses the noise in the spectrum.

Next, in step 1120, pitch detector 612 determines correlation values for frame n. Pitch detector 612 preferably determines the correlation values by applying a comb window of variable teeth size to the spectral sum for frame n, as described above in conjunction with FIG. 8. Pitch detector 612 then determines an optimum frequency index $k_n^*$ for frame n. The optimum frequency index is the frequency that produces the maximum correlation value.

In step 1122, pitch detector 612 may determine alternate correlation values for frame n. Pitch detector 612 determines the alternate correlation values by applying an alternate comb window to the spectral sum for frame n, as described above in conjunction with FIG. 9. Pitch detector 612 then determines an optimum alternate frequency index $k_n'^*$ for frame n. The optimum alternate frequency index is the frequency that produces the maximum alternate correlation value. The method continues with step 1124, which is discussed below in conjunction with FIG. 11(*b*).

Referring now to FIG. 11(*b*), a flowchart of further method steps 1110 for speech verification, including confidence determination, is shown for arbitrary frame n, according to one embodiment of the present invention. In step 1124, confidence determiner 614 compares the values of $k_n^*$ and $k_n'^*$ (FIG. 11(*a*)). If $k^*$ is equal to $k_n'^*$, then the method continues with step 1128. If $k_n^*$ is not equal to $k_n'^*$, then the method continues with step 1126.

In step 1128, confidence determiner 614 sets the harmonic index $h_n$ for frame n equal to 1. The FIG. 11(*b*) method then continues with step 1130. In step 1126, confidence determiner 614 sets the harmonic index for frame n equal to 0, and the method continues with step 1130.

In step 1130, confidence determiner 614 calculates a peak ratio for the correlation values for frame n. The peak ratio is calculated to normalize the magnitude of the maximum peak of the correlation values, as described above in conjunction with FIG. 10. In step 1132, confidence determiner 614 evaluates the sharpness of the maximum peak of the correlation values. If the peak ratio times Q is greater than $\gamma$ and the harmonic index for frame n is equal to 1, then, in step 1136, the frame confidence measure for frame n is set equal to 1. If the peak ratio times Q is not greater than $\gamma$ or the harmonic index for frame n is not equal to 1, then, in step 1134, the frame confidence measure for frame n is set equal to 0. In the FIG. 11(*b*) embodiment, $\gamma$ is equal to 0.05, however, other values for $\gamma$ are within the scope of the present invention and may be determined experimentally.

In step 1138, confidence determiner 614 evaluates the frame confidence measure for frame n and the frame confidence measures for two immediately previous frames, however, a different number of previous frame is within the scope of the present invention. If the frame confidence measures for frame n and the two previous frames are all equal to 1, then, in step 1142, confidence determiner 614 sets the confidence index for the utterance containing frame n equal to 1, indicating that the utterance is speech. If the frame confidence measures for frame n and the two previous frames are not all equal to 1, then, in step 1140, confidence determiner 614 sets the confidence index for the utterance containing frame n equal to 0, indicating that the utterance is not speech. The FIGS. 11(*a*) and 11(*b*) method steps 1110 for speech verification are preferably performed for each frame in the utterance.

The invention has been explained above with reference to a preferred embodiment. Other embodiments will be apparent to those skilled in the art in light of this disclosure. For example, the present invention may readily be implemented using configurations and techniques other than those described in the preferred embodiment above. Additionally, the present invention may effectively be used in conjunction with systems other than the one described above as the preferred embodiment. Therefore, these and other variations upon the preferred embodiments are intended to be covered by the present invention, which is limited only by the appended claims.

What is claimed is:

1. A system for speech verification of an utterance, comprising:

a speech verifier configured to generate a confidence index for said utterance, said utterance containing frames of sound energy, said speech verifier including a noise suppressor, a pitch detector, and a confidence determiner that are stored in a memory device which is coupled to said system, said noise suppressor reducing noise in a frequency spectrum for each of said frames in said utterance, said each of said frames corresponding to a frame set that includes a selected number of previous frames, said noise suppressor summing frequency spectra of each frame set to produce a spectral sum for each of said frames in said utterance; and a processor coupled to said system to control said speech verifier.

2. The system of claim 1, wherein said spectral sum for each of said frames is calculated according to a formula:

$$Z_n(k) = \sum_{i=n}^{n-N+1} X_i(\beta_i k)$$

where $Z_n(k)$ is said spectral sum for a frame n, $X_i(\beta_i k)$ is an adjusted frequency spectrum for a frame i for i equal to n through n−N+1, $\beta_i$ is a frame set scale for said frame i for i equal to n through n−N+1, and N is a selected total number of frames in said frame set.

3. The system of claim 2, wherein said frame set scale for said frame i for i equal to n through n−N+1 is selected so that a difference between said frequency spectrum for said frame n of said utterance and a frequency spectrum for said frame n−N+1 of said utterance is minimized.

4. The system of claim 1, wherein said pitch detector generates correlation values for each of said frames in said utterance and determines an optimum frequency index for each of said frames in said utterance.

5. The system of claim 1, wherein said pitch detector generates correlation values by applying a spectral comb window to said spectral sum for each of said frames in said utterance, and determines an optimum frequency index that corresponds to a maximum of said correlation values.

6. The system of claim 5, wherein said pitch detector generates said correlation values according to a formula:

$$P_n(k) = \sum_{i=1}^{N_1} W(ik)\log(|Z_n(ik)|),\ k = K_0, \ldots, K_1$$

where $P_n(k)$ are said correlation values for a frame n, W(ik) is said spectral comb window, $Z_n(ik)$ is said spectral sum for said frame n, $K_0$ is a lower frequency index, $K_1$ is an upper frequency index, and $N_1$ is a selected number of teeth of said spectral comb window.

7. The system of claim 4, wherein said pitch detector generates alternate correlation values for each of said frames in said utterance and determines an optimum alternate frequency index for each of said frames in said utterance.

8. The system of claim 4, wherein said pitch detector generates alternate correlation values by applying an alternate spectral comb window to said spectral sum for each of said frames in said utterance, and determines an optimum alternate frequency index that corresponds to a maximum of said alternate correlation values.

9. The system of claim 7, wherein said pitch detector generates said alternate correlation values by a formula:

$$P'_n(k)=\sum_{i=2}^{N_1} W(ik)\log(|Z_n(ik)|),\ k=K_0,\ \ldots,\ K_1$$

where $P'_n(k)$ are said alternate correlation values for a frame n, W(ik) is a spectral comb window, $Z_n(ik)$ is said spectral sum for said frame n, $K_0$ is a lower frequency index, $K_1$ is an upper frequency index, and $N_1$ is a selected number of teeth of said spectral comb window.

10. The system of claim 7, wherein said confidence determiner determines a frame confidence measure for each of said frames in said utterance by analyzing a maximum peak of said correlation values for each of said frames.

11. The system of claim 7, wherein said confidence determiner determines a frame confidence measure for each of said frames in said utterance according to a formula:

$$c_n=\begin{cases}1 & \text{if } R_nQ>\gamma \text{ and } h_n=1\\ 0 & \text{otherwise}\end{cases}$$

where $c_n$ is said frame confidence measure for a frame n, $R_n$ is a peak ratio for said frame n, $h_n$ is a harmonic index for said frame n, $\gamma$ is a predetermined constant, and Q is an inverse of a width of said maximum peak of said correlation values at a half-maximum point.

12. The system of claim 11, wherein said peak ratio is determined according to a formula:

$$R_n=\frac{P_{peak}-P_{avg}}{P_{peak}}$$

where $R_n$ is said peak ratio for said frame n, $P_{peak}$ is said maximum of said correlation values, and $P_{avg}$ is an average of said correlation values.

13. The system of claim 11, wherein said harmonic index is determined by a formula:

$$h_n=\begin{cases}1 & \text{if } k_n'^{*}=k_n^{*}\\ 0 & \text{otherwise}\end{cases}$$

where $h_n$ is said harmonic index for said frame n, $k_n'^*$ is said optimum alternate frequency index for said frame n, and $k_n^*$ is said optimum frequency index for said frame n.

14. The system of claim 10, wherein said confidence determiner determines said confidence index for said utterance according to a formula:

$$C=\begin{cases}1 & \text{if } c_n=c_{n-1}=c_{n-2}=1,\\ & \text{for any } n \text{ in the utterance}\\ 0 & \text{otherwise}\end{cases}$$

where C is said confidence index for said utterance, $c_n$ is said frame confidence measure for a frame n, $c_{n-1}$ is a frame confidence measure for a frame n−1, and $c_{n-2}$ is a frame confidence measure for a frame n−2.

15. The system of claim 1, wherein said speech verifier further comprises a pre-processor that generates a frequency spectrum for each of said frames in said utterance.

16. The system of claim 15, wherein said pre-processor applies a Fast Fourier Transform to each of said frames in said utterance to generate said frequency spectrum for each of said frames in said utterance.

17. The system of claim 1, wherein said system is coupled to a voice-activated electronic system.

18. The system of claim 17, wherein said voice-activated electronic system is implemented in an automobile.

19. A method for speech verification of an utterance, comprising the steps of:

generating a confidence index for said utterance by using a speech verifier, said utterance containing frames of sound energy, said speech verifier including a noise suppressor, a pitch detector, and a confidence determiner that are stored in a memory device which is coupled to an electronic system, said noise suppressor suppressing noise in a frequency spectrum for each of said frames in said utterance, said each of said frames in said utterance corresponding to a frame set that includes a selected number of previous frames, said noise suppressor summing frequency spectra of each frame set to produce a spectral sum for each of said frames in said utterance; and controlling said speech verifier with a processor that is coupled to said electronic system.

20. The method of claim 19, wherein said spectral sum for each of said frames in said utterance is calculated according to a formula:

$$Z_n(k)=\sum_{i=n}^{n-N+1} X_i(\beta_i k)$$

where $Z_n(k)$ is said spectral sum for a frame n, $X_i(\beta_i k)$ is an adjusted frequency spectrum for a frame i for i equal to n through n−N+1, $\beta_i$ is a frame set scale for said frame i for i equal to n through n−N+1, and N is a selected total number of frames in said frame set.

21. The method of claim 20, wherein said frame set scale for said frame i for i equal to n through n−N+1 is selected so that a difference between said frequency spectrum for said frame n of said utterance and a frequency spectrum for said frame n−N+1 of said utterance is minimized.

22. The method of claim 19, further comprising the steps of generating correlation values for each of said frames in said utterance and determining an optimum frequency index for each of said frames in said utterance using said pitch detector.

23. The method of claim 19, wherein said pitch detector generates correlation values by applying a spectral comb window to said spectral sum for each of said frames in said utterance, and determines an optimum frequency index that corresponds to a maximum of said correlation values.

24. The method of claim 23, wherein said pitch detector generates said correlation values according to a formula:

$$P_n(k)=\sum_{i=1}^{N_1} W(ik)\log(|Z_n(ik)|),\ k=K_0,\ \ldots,\ K_1$$

where $P_n(k)$ are said correlation values for a frame n, W(ik) is said spectral comb window, $Z_n(ik)$ is said spectral sum for said frame n, $K_0$ is a lower frequency index, $K_1$ is an upper frequency index, and $N_1$ is a selected number of teeth of said spectral comb window.

25. The method of claim 22, further comprising the steps of generating alternate correlation values for each of said frames in said utterance and determining an optimum alternate frequency index for each of said frames in said utterance using said pitch detector.

26. The method of claim 22, wherein said pitch detector generates alternate correlation values by applying an alternate spectral comb window to said spectral sum for each of said frames in said utterance, and determines an optimum alternate frequency index that corresponds to a maximum of said alternate correlation values.

27. The method of claim 25, wherein said pitch detector generates said alternate correlation values by a formula:

$$P'_n(k) = \sum_{i=2}^{N_1} W(ik)\log(|Z_n(ik)|),\ k = K_0, \ldots, K_1$$

where $P'_n(k)$ are said alternate correlation values for a frame n, W(ik) is a spectral comb window, $Z_n(ik)$ is said spectral sum for said frame n, $K_0$ is a lower frequency index, $K_1$ is an upper frequency index, and $N_1$ is a selected number of teeth of said spectral comb window.

28. The method of claim 25, further comprising the step of determining a frame confidence measure for each of said frames in said utterance by analyzing a maximum peak of said correlation values for each of said frames using said confidence determiner.

29. The method of claim 25, wherein said confidence determiner determines a frame confidence measure for each of said frames in said utterance according to a formula:

$$c_n = \begin{cases} 1 & \text{if } R_n Q > \gamma \text{ and } h_n = 1 \\ 0 & \text{otherwise} \end{cases}$$

where $c_n$ is said frame confidence measure for a frame n, $R_n$ is a peak ratio for said frame n, $h_n$ is a harmonic index for said frame n, $\gamma$ is a predetermined constant, and Q is an inverse of a width of said maximum peak of said correlation values at a half-maximum point.

30. The method of claim 29, wherein said peak ratio is determined according to a formula:

$$R_n = \frac{P_{peak} - P_{avg}}{P_{peak}}$$

where $R_n$ is said peak ratio for said frame n, $P_{peak}$ is said maximum of said correlation values, and $P_{avg}$ is an average of said correlation values.

31. The method of claim 29, wherein said harmonic index is determined by a formula:

$$h_n = \begin{cases} 1 & \text{if } k_n'^* = k_n^* \\ 0 & \text{otherwise} \end{cases}$$

where $h_n$ is said harmonic index for said frame n, $k_n'^*$ is said optimum alternate frequency index for said frame n, and $k_n^*$ is said optimum frequency index for said frame n.

32. The method of claim 28, wherein said confidence determiner determines said confidence index for said utterance according to a formula:

$$C = \begin{cases} 1 & \text{if } c_n = c_{n-1} = c_{n-2} = 1, \\ & \text{for any } n \text{ in the utterance} \\ 0 & \text{otherwise} \end{cases}$$

where C is said confidence index for said utterance, $c_n$ is said frame confidence measure for a frame n, $c_{n-1}$ is a frame confidence measure for a frame n−1, and $c_{n-2}$ is a frame confidence measure for a frame n−2.

33. The method of claim 19, further comprising the step of generating a frequency spectrum for each of said frames in said utterance using a pre-processor.

34. The method of claim 33, wherein said pre-processor applies a Fast Fourier Transform to each of said frames in said utterance to generate said frequency spectrum for each of said frames in said utterance.

* * * * *